(12) United States Patent
Yang et al.

(10) Patent No.: US 12,192,137 B2
(45) Date of Patent: *Jan. 7, 2025

(54) OBJECT RECEIVING METHOD AND DEVICE

(71) Applicant: VIVO MOBILE COMMUNICATION CO., LTD., Guangdong (CN)

(72) Inventors: Yu Yang, Guangdong (CN); Peng Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/439,202

(22) Filed: Feb. 12, 2024

(65) Prior Publication Data

US 2024/0187166 A1 Jun. 6, 2024

Related U.S. Application Data

(63) Continuation of application No. 17/371,208, filed on Jul. 9, 2021, now Pat. No. 12,052,191, which is a continuation of application No. PCT/CN2020/070879, filed on Jan. 8, 2020.

(30) Foreign Application Priority Data

Jan. 11, 2019 (CN) .......................... 201910028462.7

(51) Int. Cl.
*H04L 5/00* (2006.01)
*H04W 24/10* (2009.01)

(52) U.S. Cl.
CPC ........... *H04L 5/0048* (2013.01); *H04W 24/10* (2013.01)

(58) Field of Classification Search
CPC .............................. H04W 24/10; H04W 24/78
See application file for complete search history.

(56) References Cited

U.S. PATENT DOCUMENTS

| 9,531,448 | B2 | 12/2016 | Sesia et al. |
| 10,039,076 | B2 | 7/2018 | Islam et al. |
| 2015/0358848 | A1 | 12/2015 | Kim et al. |
| 2018/0054797 | A1 | 2/2018 | Islam et al. |
| 2018/0219606 | A1 | 8/2018 | Ng et al. |
| 2018/0324727 | A1 | 11/2018 | Zhou |

(Continued)

FOREIGN PATENT DOCUMENTS

| CN | 104937869 A | 9/2015 |
| CN | 108092754 A | 5/2018 |

(Continued)

OTHER PUBLICATIONS

Vivo, Change Request, Draft CR on simultaneous reception of DL/UL physical channels and RSs, 3GPP TSG-RAN WG1 Meeting #95, R1-1812287, Nov. 12-16, 2018, Spokane, USA.

(Continued)

*Primary Examiner* — Phong La
(74) *Attorney, Agent, or Firm* — Price Heneveld LLP

(57) ABSTRACT

This disclosure provides an object receiving method and a device. The method includes: determining an association relationship between a target object and a source object, where the object includes a reference signal or a channel, and the association relationship includes a quasi co-location QCL relationship or a receive beam relationship.

18 Claims, 3 Drawing Sheets

Determine an association relationship between a target object and a source object, where the object includes a reference signal or a channel and the association relationship includes a quasi co-location QCL relationship or a receive beam relationship — S101

(56) References Cited

U.S. PATENT DOCUMENTS

| | | | |
|---|---|---|---|
| 2019/0190669 A1* | 6/2019 | Park | H04W 72/21 |
| 2019/0379431 A1 | 12/2019 | Park et al. | |
| 2020/0059277 A1 | 2/2020 | Su et al. | |
| 2020/0068574 A1 | 2/2020 | Qin et al. | |
| 2020/0120531 A1 | 4/2020 | Qin et al. | |
| 2020/0280416 A1 | 9/2020 | Gao et al. | |
| 2021/0091827 A1* | 3/2021 | Namba | H04B 17/309 |
| 2021/0204266 A1* | 7/2021 | Ahn | H04W 24/10 |
| 2021/0336741 A1* | 10/2021 | Yang | H04L 5/0048 |
| 2021/0409175 A1 | 12/2021 | Matsumura et al. | |
| 2022/0053385 A1* | 2/2022 | Li | H04W 36/085 |
| 2023/0208490 A1* | 6/2023 | Kim | H04L 5/0051 |
| | | | 370/329 |

FOREIGN PATENT DOCUMENTS

| | | | | |
|---|---|---|---|---|
| CN | 108288985 A | | 7/2018 | |
| CN | 108810934 A | | 11/2018 | |
| CN | 109151888 A | | 1/2019 | |
| CN | 113228735 A | * | 8/2021 | H04L 1/00 |
| WO | 2018021867 A1 | | 2/2018 | |
| WO | 2018083253 A1 | | 5/2018 | |
| WO | 2018128410 A1 | | 7/2018 | |
| WO | WO-2018202137 A1 | * | 11/2018 | H04L 5/0051 |

OTHER PUBLICATIONS

Vivo, Draft CR on simultaneous reception of DL/UL physical channels and RSs, 3GPP TSG-RAN WG1 Meeting #95, R1-1812287, Nov. 12-16, 2018, Spokane, USA.

Intel Corporation, Corrections to QCL for NR, 3GPP TSG RAN WG1 Meeting AH 1801, R1-1800320, Jan. 22-26, 2018, Vancouver, Canada.

Huawei, Hisilicon, Correction on QCL Type C for feCoMP in 36.213, 3GPP TSG RAN WG1 Meeting #93, R1-1806448, May 21-25, 2018, Busan, Korea.

Vivo, Further discussion on Multi-Beam Operation, 3GPP TSG RAN WG1 #96bis, R1-1904097, Apr. 8-12, 2019, Xi'an, China.

Ericsson, Correction to 38.214 on simultaneous reception of PDCCH and PDSCH, 3GPP TSG RAN WG1 Meeting #95, R1-1813251, Nov. 12-16, 2018, Spokane, United States.

Ericsson, Draft CR to TS 38.213 on PDCCH QCL TypeD collision, 3GPP TSG RAN WG1 Meeting #95, R1-1813251, Nov. 12-16, 2018, Spokane, United States.

Ericsson, Maintenance for simultaneous RX and TX, 3GPP TSG-RAN WG1 Meeting #95, Tdoc R1-1813251, Nov. 12-16, 2018, Spokane, United States.

Ericsson, "Enhancements on Multi-beam Operation", 3GPP TSG-RAN WG1 Meeting #95, R1-1813267, Spokane, USA, Nov. 12-16, 2018.

* cited by examiner

OBJECT RECEIVING METHOD AND DEVICE

CROSS-REFERENCE TO RELATED APPLICATIONS

This application claims the benefit of and is a continuation application of U.S. patent application Ser. No. 17/371,208 filed on Jul. 9, 2021 which is a continuation application of International Application No. PCT/CN2020/070879 filed on Jan. 8, 2020, which claims priority to Chinese Patent Application No. 201910028462.7, filed in China on Jan. 11, 2019, which are incorporated herein by reference in their entirety.

TECHNICAL FIELD

This disclosure relates to the field of communications technologies, and more specifically, to an object receiving method and a device.

BACKGROUND

To support access of a larger number of users, multiple-input multiple-output (MIMO) technologies with more antenna ports, for example, massive MIMO (Massive MIMO) technologies using massive antenna arrays, have been introduced into mobile communications systems. Beamforming is one of the key technologies of massive MIMO to implement multi-user MIMO (MU-MIMO), and can generate a directional beam by adjusting a weighting coefficient of each element in the antenna arrays. Different beams obtained by beamforming have different quality. Therefore, it is necessary to perform parameter measurement and select a suitable beam for signal or channel transmission based on measurement results.

When transmitting a channel or a reference signal, a network device configures information of a target channel or a target reference signal resource for a terminal device, and indicates, in the configuration information, QCL information (including information about a source reference signal) corresponding to the channel or the reference signal resource. The terminal device can receive the target channel or the target reference signal resource based on spatial receiving parameters corresponding to the source reference signal. However, when the spatial receiving parameters corresponding to the source reference signal are not unique, the terminal device is unable to know which spatial receiving parameters are usable for receiving the target channel or the target reference signal resource.

SUMMARY

Some embodiments of this disclosure provide an object receiving method and a device.

According to a first aspect, an object receiving method is provided. The method is applied to a terminal device and includes:

determining an association relationship between a target object and a source object, where the object includes a reference signal or a channel, and the association relationship includes a quasi co-location QCL relationship or a receive beam relationship.

According to a second aspect, a terminal device is provided, where the terminal device includes:

an association relationship determining module, configured to determine an association relationship between a target object and a source object, where the object includes a reference signal or a channel, and the association relationship includes a quasi co-location QCL relationship or a receive beam relationship.

According to a third aspect, a terminal device is provided, and the terminal device includes a memory, a processor, and a wireless communication program stored in the memory and capable of running on the processor, where when the wireless communication program is executed by the processor, the steps of the method according to the first aspect are implemented.

According to a fourth aspect, a non-transitory computer-readable storage medium is provided, where the non-transitory computer-readable storage medium stores a wireless communication program, and when the wireless communication program is executed by a processor, the steps of the method according to the first aspect are implemented.

BRIEF DESCRIPTION OF DRAWINGS

To describe the technical solutions in the embodiments of this disclosure or in the prior art more clearly, the following briefly describes the accompanying drawings required for describing the embodiments or the prior art. Apparently, the accompanying drawings in the following description show merely some embodiments recorded in this disclosure, and a person of ordinary skill in the art may still derive other drawings from these accompanying drawings.

DESCRIPTION OF EMBODIMENTS

To make a person skilled in the art understand the technical solutions in this disclosure better, the following clearly describes the technical solutions in the embodiments of this disclosure with reference to the accompanying drawings in the embodiments of this disclosure. Apparently, the described embodiments are merely some but not all of the embodiments of this disclosure. All other embodiments obtained by a person of ordinary skill in the art based on the embodiments of this disclosure shall fall within the protection scope of this disclosure.

It should be understood that the technical solutions of the embodiments of this disclosure may be applied to various communications systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a 5G system or new radio (NR) system.

A terminal device (UE), also referred to as a mobile terminal (Mobile Terminal), a mobile terminal device, or the like, may communicate with one or more core networks through a radio access network (RAN). The terminal device may be a mobile terminal, such as a mobile phone (or referred to as a "cellular" phone) or a computer with a mobile terminal. For example, the terminal device may be a portable, pocket-sized, handheld, computer built-in, or in-vehicle mobile apparatus, which exchanges voice and/or data with the radio access network.

A network device is an apparatus deployed in a radio access network and used for providing parameter measurement functions. The network device may be a base station, and the base station may be a base station (BTS) in GSM or CDMA, may be a NodeB(NodeB) in WCDMA, an evolved NodeB (eNB or e-NodeB) in LTE or a 5G base station (gNB), or a network-side device in a later evolved communications system. However, the terms used do not constitute any limitation on the protection scope of this disclosure.

It should be noted that during description of optional embodiments, sequence numbers of the processes do not mean the order of execution and should not be construed as any limitation on the implementation processes of the embodiments of this disclosure. The order of execution of the processes should be determined according to functions and internal logic of the processes.

Figure 1:
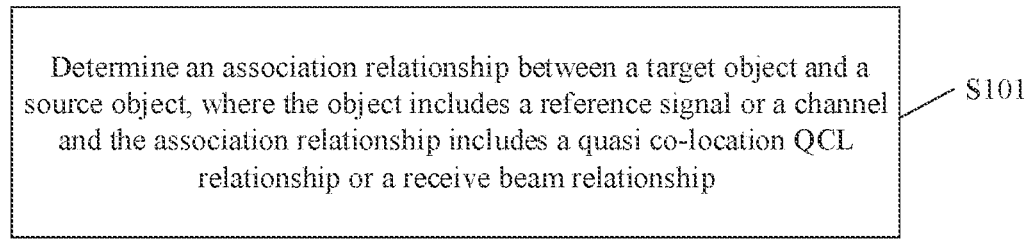
FIG. 1 is a schematic flowchart 1 of an object receiving method according to some embodiments of this disclosure.
Figure 2:
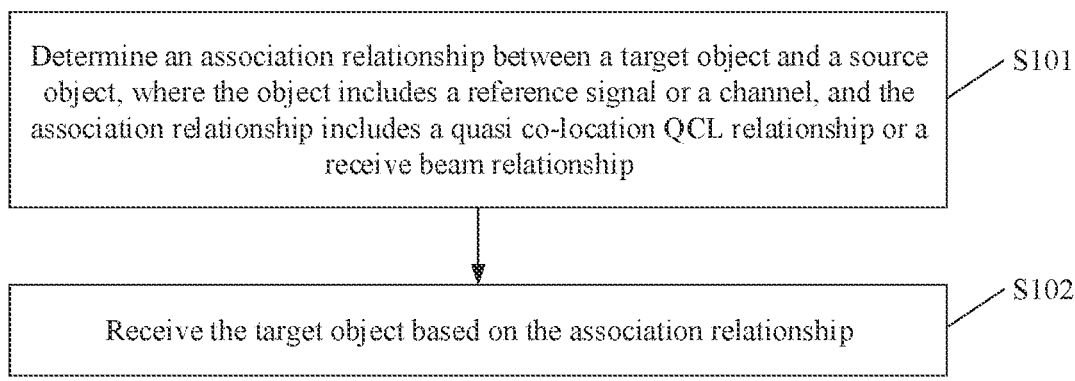
FIG. 2 is a schematic flowchart 2 of an object receiving method according to some embodiments of this disclosure.

The following describes an object receiving method applied to a terminal device with reference to FIG. 1 and FIG. 2.

FIG. 1 shows an object receiving method according to an embodiment of this disclosure, applied to a terminal device. As shown in FIG. 1, the method may include the following step:

Step 101. Determine an association relationship between a target object and a source object.

The object may include a reference signal (RS) or a channel, where the reference signal may include a channel state information-reference signal (CSI-RS) and other reference signals, and the channel may include a data channel and a control channel. The association relationship may include a quasi co-location (QCL) relationship or a receive beam relationship.

The following describes a manner of determining the association relationship between the target object and the source object by using multiple examples.

In a first example, the association relationship may be directly configured by a network device explicitly for the terminal device, or may be fixed in a preset protocol. To be specific, step 101 may include: determining the association relationship based on at least one of configuration information for configuring the association relationship and the preset protocol.

For example, the network device can directly configure the association relationship between the target object and the source object through radio resource control (RRC) signaling, for example, configuring the association relationship between the target object and the source object to an association relationship of a preset QCL type, where the preset QCL type may be any one of QCL type A, QCL type B, QCL type C, and QCL type D, or may be a newly defined QCL type.

In a second example, the association relationship may further include a newly defined QCL type, where the newly defined QCL type (QCL-type) may be a type other than QCL type A, QCL type B, QCL type C, and QCL type D, and may be used to determine a spatial QCL relationship corresponding to a signal to interference plus noise ratio SINR measurement. More specifically, the spatial QCL relationship may be a spatial QCL relationship of QCL type D, or a spatial QCL relationship different from QCL type D, so that the terminal device can determine a spatial receiving parameter (Spatial Rx Parameters) for the target object based on the newly defined QCL type.

In a third example, step 101 may be determining the association relationship based on a measurement parameter corresponding to the source object. When the target object is a channel or a reference signal, and the source object is a source reference signal, the measurement parameter corresponding to the source object may include at least one of layer 1 (Layer 1, L1) reference signal received power (Reference Signal Receiving Power, RSRP) and signal to interference plus noise ratio (Signal to Interference plus Noise Ratio, SINR).

Generally, when the terminal device measures a transmit beam of the network device, the network device configures a reference signal resource set (RS resource set) for beam measurement for the terminal device, and the terminal device uses the configured reference signal resources to measure RSRPs or SINRs corresponding to beam links, encapsulates, based on the RSRPs or the SINRs, related information of multiple beams with optimal measurement results into a measurement report, and sends the report to the network device for the network device to select a beam to be used to transmit a signal or a channel to the terminal device. Therefore, the measurement parameter corresponding to the source object in the second example (similar applies to the following description) may refer to a measurement parameter obtained with the source object used as a reference signal resource for beam measurement.

In an optional implementation, if the measurement parameters corresponding to the source object are RSRP and SINR, the association relationship may be determined based on QCL information corresponding to the RSRP. Specifically, QCL information used for measuring the RSRP of the source object may be determined to be QCL information of the target channel or the target reference signal. For example, if a spatial receiving parameter Rx1 (a receive beam 1) is used for measuring the RSRP of the source object, the association relationship is determined to be the target object being associated with the source object through the receive beam 1.

In another optional implementation, if the measurement parameter corresponding to the source object is reference signal received power RSRP, the association relationship is determined based on the QCL information corresponding to the RSRP. For example, if a spatial receiving parameter Rx1 (a receive beam 1) is used for measuring the RSRP of the source object, the association relationship is determined to be the target object being associated with the source object through the receive beam 1.

In still another optional implementation, if the measurement parameter corresponding to the source object is signal to interference plus noise ratio SINR, the association relationship is determined based on QCL information corresponding to the signal to interference plus noise ratio SINR.

For example, if a spatial receiving parameter Rx2 (a receive beam 2) is used for measuring the SINR of the source object, the association relationship is determined to be the target object being associated with the source object through the receive beam 2.

In the fourth example, step 101 may be determining the association relationship based on a type of the source object or the target object, and different types of source objects or target objects correspond to a same association relationship or different association relationships.

Types of the source object or the target object include a reference signal type, a data channel type, a control channel type, and the like.

In an implementation, the association relationship between the target object and the source object may be determined directly based on a pre-established correspondence between the type of the source object or the target object and the association relationship.

For example, it may be predetermined that an association relationship corresponding to the reference signal type is a QCL relationship of QCL type A, and then when the type of the target object or the source object is the reference signal type, it may be determined that the association relationship between the target object and the source object is the QCL relationship of QCL type A; or, it may be predetermined that an association relationship corresponding to the data channel type is a QCL relationship of QCL type B, and then when the type of the target object or the source object is the data channel type, it may be determined that the association relationship between the target object and the source object is the QCL relationship of QCL type B; or, it may be predetermined that an association relationship corresponding to the control channel type is a QCL relationship of QCL type D, and then when the type of the target object or the source object is the control channel type, it may be determined that the association relationship between the target object and the source object is the QCL relationship of QCL type D.

In another implementation, the determining the association relationship based on a type of the source object or the target object may include: determining a measurement parameter corresponding to the type of the source object or the target object, and determining the association relationship based on the measurement parameter.

The optional manner of determining the association relationship based on the measurement parameter may be similar to the third example.

For example, when the type of the source object or the target object is the reference signal type, the measurement parameter corresponding to the source object or the target object is determined to be RSRP, so that the association relationship can be determined based on the QCL information corresponding to the RSRP. For another example, when the type of the source object or the target object is the data channel type, the measurement parameter corresponding to the source object or the target object is determined to be SINR, so that the association relationship can be determined based on the QCL information corresponding to the SINR.

In the fifth example, step 101 may include: determining the association relationship based on a type of the QCL relationship, configured by a network, between the target object and the source object.

For example, if the QCL relationship between the target object and the source object configured by the network is a QCL relationship of QCL type D, the association relationship is determined to be the QCL relationship of QCL type D.

Optionally, the type of the QCL relationship configured by the network corresponds to the measurement parameter corresponding to the source object, which means the type of the QCL relationship configured by the network is determined based on the measurement parameter corresponding to the source object. For example, if the measurement parameter corresponding to the source object is RSRP, the type of the QCL relationship configured by the network is a type of the QCL relationship corresponding to the RSRP; and if the measurement parameter corresponding to the source object is SINR, the type of the QCL relationship configured by the network is a type of the QCL relationship corresponding to the SINR.

In the sixth example, step 101 may include: determining the association relationship based on a historical measurement report closest to a current moment, where the historical measurement report is a measurement report, reported by the terminal device, about a measurement parameter corresponding to the source object.

For the description of the measurement report, refer to the third example.

In an optional implementation, if the association relationship is determined based on the historical measurement report, and the historical measurement report is a measurement report about RSRP, the association relationship is determined based on QCL information corresponding to the RSRP.

In another optional implementation, if the association relationship is determined based on the historical measurement report, and the historical measurement report is a measurement report about SINR, the association relationship is determined based on QCL information corresponding to the SINR.

In still another optional implementation, if the association relationship is determined based on the historical measurement report, and the historical measurement report is a measurement report about reference signal received power RSRP and signal to interference plus noise ratio SINR, the association relationship is determined based on QCL information corresponding to the RSRP or the SINR.

In a seventh example, step 101 may include: determining the association relationship based on a transmission mode of transmitting the source object or the target object by a network device, where different transmission modes correspond to a same association relationship or different association relationships.

The transmission mode may include at least one of the following modes: a periodic transmission mode, a semi-persistent transmission mode, an aperiodic transmission mode, and the like.

In an optional implementation, the association relationship between the target object and the source object may be determined directly based on a pre-established correspondence between the transmission mode and the association relationship.

For example, it may predetermined that an association relationship corresponding to the periodic transmission mode is a QCL relationship of QCL type A, and then when the transmission mode of the target object or the source object is the periodic transmission mode, it may be determined that the association relationship between the target object and the source object is the QCL relationship of QCL type A; or, it may be predetermined that an association relationship corresponding to the semi-persistent transmission mode is a QCL relationship of QCL type B, and then when the transmission mode of the target object or the source object is the semi-persistent transmission mode, it may be determined that the association relationship between the target object and the source object is the QCL relationship of QCL type B; or, it may predetermined that an association relationship corresponding to the aperiodic transmission mode is a QCL relationship of QCL type D, and then when the transmission mode of the target object or the source object is the aperiodic transmission mode, it may be determined that the association relationship between the target object and the source object is the QCL relationship of QCL type D.

In another implementation, the determining the association relationship based on a transmission mode of transmitting the source object or the target object by a network device may include: determining a measurement parameter corresponding to the transmission mode of transmitting the source object or the target object, and determining the association relationship based on the measurement parameter.

The optional manner of determining the association relationship based on the measurement parameter may be similar to the third example.

For example, when the transmission mode of the source object or the target object is the periodic transmission mode, it may be determined that the measurement parameter corresponding to the source object or the target object is RSRP, so that the association relationship can be determined based on the QCL information corresponding to the RSRP. For another example, when the transmission mode of the source object or the target object is the semi-persistent transmission mode, it is determined that the measurement parameter corresponding to the source object or the target object is SINR, so that the association relationship can be determined based on the QCL information corresponding to the SINR.

It should be noted that the manner of determining the association relationship between the target object and the source object may not be limited to the manners described in the foregoing several examples.

The object receiving method provided by some embodiments of this disclosure can determine an association relationship between a target object and a source object, and the association relationship includes a QCL relationship or a receive beam relationship. Therefore, a receiving parameter of the target object can be determined for receiving the target object, improving effectiveness of communication.

Optionally, as shown in FIG. 2, the object receiving method provided in some embodiments of this disclosure may further include:

Step 102. Receive the target object based on the association relationship to implement receiving of the target object, thus improving the effectiveness of communication.

Figure 3:
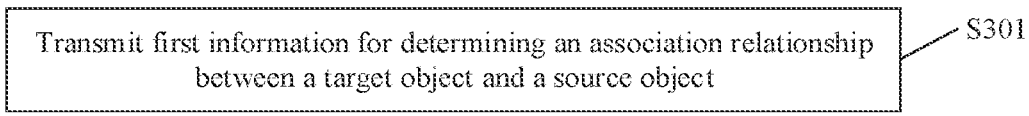
FIG. 3 is a schematic flowchart of a method for assisting in receiving an object according to some embodiments of this disclosure.

The foregoing describes the object receiving method applied to a terminal device. Corresponding to the foregoing object receiving method, as shown in FIG. 3, some embodiments of this disclosure further provide a method for assisting in receiving an object, applied to a network device. The method for assisting in receiving an object may include:

Step 301. Transmit first information for determining an association relationship between a target object and a source object, where the first information may be configuration information such as RRC.

The object may include a reference signal or a channel, and the association relationship may include a quasi co-location (QCL) relationship or a receive beam relationship.

In an example, the network device may explicitly configure the association relationship for the terminal device, which means the first information includes the association relationship. In this way, the terminal device can directly determine the association relationship between the target object and the source object after receiving the first information.

For example, the network device can directly configure the association relationship between the target object and the source object through the RRC, for example, determining the association relationship by configuring a QCL type of the target object and the source object.

In another example, the network device may implicitly configure the association relationship for the terminal device. For example, the first information includes second information for determining the association relationship. In this way, the terminal device can determine, after receiving the first information, the association relationship between the target object and the source object based on the second information included in the first information.

In an optional implementation, the second information includes a measurement parameter corresponding to the source object, and the measurement parameter may be used to determine the association relationship.

For example, if the measurement parameter corresponding to the source object is RSRP and SINR, the association relationship may be determined based on QCL information corresponding to the RSRP; if the measurement parameter corresponding to the source object is reference signal received power RSRP, the association relationship is determined based on QCL information corresponding to the RSRP; or if the measurement parameter corresponding to the source object is signal to interference plus noise ratio SINR, the association relationship is determined based on QCL information corresponding to the signal to interference plus noise ratio SINR.

In another optional implementation, the second information may include a type of the QCL relationship between the target object and the source object, and the type of the QCL relationship may be used to determine the association relationship.

The method for assisting in receiving an object provided by some embodiments of this disclosure can transmit the first information for determining the association relationship between the target object and the source object to the terminal device, and the association relationship may include the QCL relationship or the receive beam relationship. Therefore, this method can help the terminal device determine the receiving parameter of the target object, to receive the target object, thereby improving effectiveness of communication.

There is still another implementation. When the network device configures a higher layer parameter ReportQuantity to none in configuration information of the measurement report (for example, a CSI report or a beam report), the terminal device does not need to transmit a report to the network device, but the terminal device can still determine, based on configuration information of an RS resource from the network device, whether to perform L1-RSRP measurement or L1-SINR measurement for an RS resource associated with the report.

There is still another implementation: a new parameter is added to the configuration information of the measurement report, for example, adding values of the higher layer parameter ReportQuantity, such as none-RSRP and none-SINR, or values in other names indicating that the terminal device does not need to transmit a report to the network device, but the terminal device still needs to measure the RSRP or the SINR. For example, when the value is none-RSRP, the terminal device measures RSRP of an RS resource associated with the report; and when the value is none-SINR, the terminal device measures SINR of an RS resource associated with the report.

Figure 4:
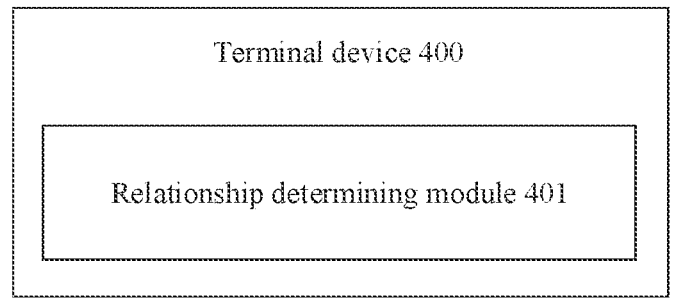
FIG. 4 is a schematic structural diagram 1 of a terminal device 400 according to some embodiments of this disclosure.
Figure 5:
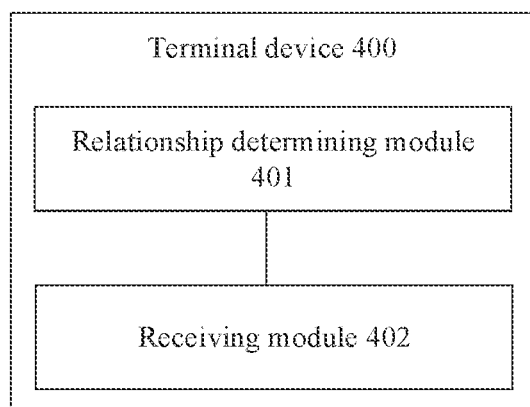
FIG. 5 is a schematic structural diagram 2 of a terminal device 400 according to some embodiments of this disclosure.

The following describes a terminal device according to some embodiments of this disclosure in detail with reference to FIG. 4 and FIG. 5.

FIG. 4 is a schematic structural diagram of a terminal device according to some embodiments of this disclosure. As shown in FIG. 4, the terminal device 400 includes a relationship determining module 401.

The relationship determining module 401 is configured to determine an association relationship between a target object and a source object.

The object includes a reference signal or a channel, and the association relationship includes a QCL relationship or a receive beam relationship.

The following describes a manner of determining the association relationship between the target object and the source object by the relationship determining module 401 by using multiple examples.

In a first example, a network device may explicitly configure the association relationship directly to the relationship determining module 401 for the terminal device, or the association relationship may be fixed in a preset protocol. To be specific, step 101 may include: determining the association relationship based on at least one of configuration information for configuring the association relationship and the preset protocol.

In a second example, the association relationship may further include a newly defined QCL type, where the newly defined QCL type (QCL-type) may be a type other than QCL type A, QCL type B, QCL type C, and QCL type D, and may be used to determine a spatial QCL relationship corresponding to a signal to interference plus noise ratio SINR measurement. More specifically, the spatial QCL relationship may be a spatial QCL relationship of QCL type D, or a spatial QCL relationship different from QCL type D, so that the terminal device can determine a spatial receiving parameter (Spatial Rx Parameters) for the target object based on QCL type D.

In a third example, the relationship determining module 401 may determine the association relationship based on a measurement parameter corresponding to the source object. When the target object is a channel or a reference signal, and the source object is a source reference signal, the measurement parameter corresponding to the source object may include at least one of layer 1 (Layer 1, L1) reference signal resource received power (RSRP) and a signal to interference plus noise ratio (SINR).

Generally, when the terminal device measures a transmit beam of the network device, the network device configures a reference signal resource set (RS resource set) for beam measurement for the terminal device, and the terminal device uses the configured reference signal resources to measure RSRPs or SINRs corresponding to beam links, encapsulates, based on the RSRPs or the SINRs, related information of multiple beams with optimal measurement results into a measurement report, and sends the report to the network device for the network device to select a beam to be used to transmit a signal or a channel to the terminal device. Therefore, the measurement parameter corresponding to the source object in the second example (similar applies to the following description) may refer to a measurement parameter obtained with the source object used as a reference signal resource for beam measurement.

In an optional implementation, if the measurement parameters corresponding to the source object are RSRP and SINR, the association relationship may be determined based on QCL information corresponding to the RSRP. Specifically, QCL information used for measuring the RSRP of the source object may be determined to be QCL information of the target channel or the target reference signal. For example, if a spatial receiving parameter Rx1 (a receive beam 1) is used for measuring the RSRP of the source object, the association relationship is determined to be the target object being associated with the source object through the receive beam 1.

In another optional implementation, if the measurement parameter corresponding to the source object is reference signal received power RSRP, the association relationship is determined based on the QCL information corresponding to the RSRP. For example, if a spatial receiving parameter Rx1 (a receive beam 1) is used for measuring the RSRP of the source object, the association relationship is determined to be the target object being associated with the source object through the receive beam 1.

In still another optional implementation, if the measurement parameter corresponding to the source object is signal to interference plus noise ratio SINR, the association relationship is determined based on the QCL information corresponding to the signal to interference plus noise ratio SINR. For example, if a spatial receiving parameter Rx2 (a receive beam 2) is used for measuring the SINR of the source object, the association relationship is determined to be the target object being associated with the source object through the receive beam 2.

In a fourth example, the relationship determining module 401 may determine the association relationship based on a type of the source object or the target object, and different types of source objects or target objects correspond to a same association relationship or different association relationships.

Types of the source object or the target object include a reference signal type, a data channel type, a control channel type, and the like.

In an implementation, the association relationship between the target object and the source object may be determined directly based on a pre-established correspondence between the type of the source object or the target object and the association relationship.

In another implementation, the determining the association relationship based on a type of the source object or the target object may include: determining a measurement parameter corresponding to the type of the source object or the target object, and determining the association relationship based on the measurement parameter.

The optional manner of determining the association relationship based on the measurement parameter may be similar to the third example.

In a fifth example, the relationship determining module 401 may determine the association relationship based on a type of the QCL relationship, configured by a network, between the target object and the source object.

Optionally, the type of the QCL relationship configured by the network corresponds to the measurement parameter corresponding to the source object, which means the type of the QCL relationship configured by the network is determined based on the measurement parameter corresponding to the source object.

In a sixth example, the relationship determining module 401 may determine the association relationship based on a historical measurement report closest to a current moment, where the historical measurement report is a measurement report about a measurement parameter corresponding to the source object, reported by the terminal device.

For the description of the measurement report, refer to the third example.

In an optional implementation, if the association relationship is determined based on the historical measurement report, and the historical measurement report is a measurement report about RSRP, the association relationship is determined based on QCL information corresponding to the RSRP.

In another optional implementation, if the association relationship is determined based on the historical measurement report, and the historical measurement report is a measurement report about SINR, the association relationship is determined based on QCL information corresponding to the SINR.

In still another optional implementation, if the association relationship is determined based on the historical measurement report, and the historical measurement report is a measurement report about reference signal received power RSRP and signal to interference plus noise ratio SINR, the association relationship is determined based on QCL information corresponding to the RSRP or the SINR.

In a seventh example, the relationship determining module 401 may determine the association relationship based on a transmission mode of transmitting the source object or the target object by a network device, where different transmission modes correspond to a same association relationship or different association relationships.

The transmission mode may include at least one of the following modes: a periodic transmission mode, a semi-persistent transmission mode, an aperiodic transmission mode, and the like.

In an optional implementation, the association relationship between the target object and the source object may be determined directly based on a pre-established correspondence between the transmission mode and the association relationship.

In another implementation, the determining the association relationship based on a transmission mode of transmitting the source object or the target object by a network device may include: determining a measurement parameter corresponding to the transmission mode of transmitting the source object or the target object, and determining the association relationship based on the measurement parameter.

The optional manner of determining the association relationship based on the measurement parameter may be similar to the third example.

In addition, there is another implementation. When the network device configures a higher layer parameter ReportQuantity to none in configuration information of the measurement report (for example, a CSI report or a beam report), the terminal device does not need to transmit a report to the network device, but the terminal device can still determine, based on configuration information of an RS resource from the network device, whether to perform L1-RSRP measurement or L1-SINR measurement for an RS resource associated with the report.

There is still another implementation: a new parameter is added to the configuration information of the measurement report, for example, adding values of the higher layer parameter ReportQuantity, such as none-RSRP and none-SINR, or values in other names indicating that the terminal device does not need to transmit a report to the network device, but the terminal device still needs to measure the RSRP or the SINR. For example, when the value is none-RSRP, the terminal device measures RSRP of an RS resource associated with the report; and when the value is none-SINR, the terminal device measures SINR of an RS resource associated with the report.

It should be noted that the manner of determining the association relationship between the target object and the source object may not be limited to the manners described in the foregoing several examples.

The terminal device 400 provided by some embodiments of this disclosure can determine an association relationship between a target object and a source object, and the association relationship includes a QCL relationship or a receive beam relationship. Therefore, a receiving parameter of the target object can be determined for receiving the target object, improving effectiveness of communication.

Optionally, as shown in FIG. 5, the terminal device 400 may further include a receiving module 402.

The receiving module 402 receives the target object based on the association relationship, implementing receiving of the target object and improving the effectiveness of communication.

The terminal device 400 shown in FIG. 4 and FIG. 5 may be used to implement the embodiments of the object receiving method shown in FIG. 1 and FIG. 2. For related details, refer to the foregoing method embodiments.

Figure 6:
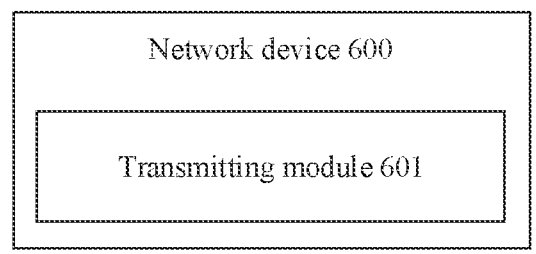
FIG. 6 is a schematic structural diagram of a network device 600 according to some embodiments of this disclosure.

The following describes a network device according to some embodiments of this disclosure in detail with reference to FIG. 6.

FIG. 6 is a schematic structural diagram of a network device according to some embodiments of this disclosure. As shown in FIG. 6, the network device 600 includes a transmitting module 601.

The transmitting module 601 is configured to transmit first information for determining an association relationship between a target object and a source object, where the first information may be configuration information such as RRC.

The object may include a reference signal or a channel, and the association relationship may include a quasi co-location (QCL) relationship or a receive beam relationship.

In an example, the network device may explicitly configure the association relationship for the terminal device, which means the first information includes the association relationship. In this way, the terminal device can directly determine the association relationship between the target object and the source object after receiving the first information.

For example, the network device can directly configure the association relationship between the target object and the source object through the RRC, for example, configuring the association relationship by configuring a QCL type of the target object and the source object.

In another example, the network device may implicitly configure the association relationship for the terminal device. For example, the first information includes second information for determining the association relationship. In this way, the terminal device can determine, after receiving the first information, the association relationship between the target object and the source object based on the second information included in the first information.

In an optional implementation, the second information includes a measurement parameter corresponding to the source object, and the measurement parameter may be used to determine the association relationship.

In another optional implementation, the second information may include a type of the QCL relationship between the target object and the source object, and the type of the QCL relationship may be used to determine the association relationship.

The network device 600 provided by some embodiments of this disclosure can transmit first information for determining the association relationship between the target object and the source object to the terminal device, and the association relationship includes the QCL relationship or the receive beam relationship. This can help the terminal device determine a receiving parameter of the target object for receiving the target object, improving effectiveness of communication.

The network device 600 shown in FIG. 6 may be used to implement various embodiments of the method for assisting in receiving an object shown in FIG. 3. For related details, refer to the foregoing method embodiments.

Figure 7:
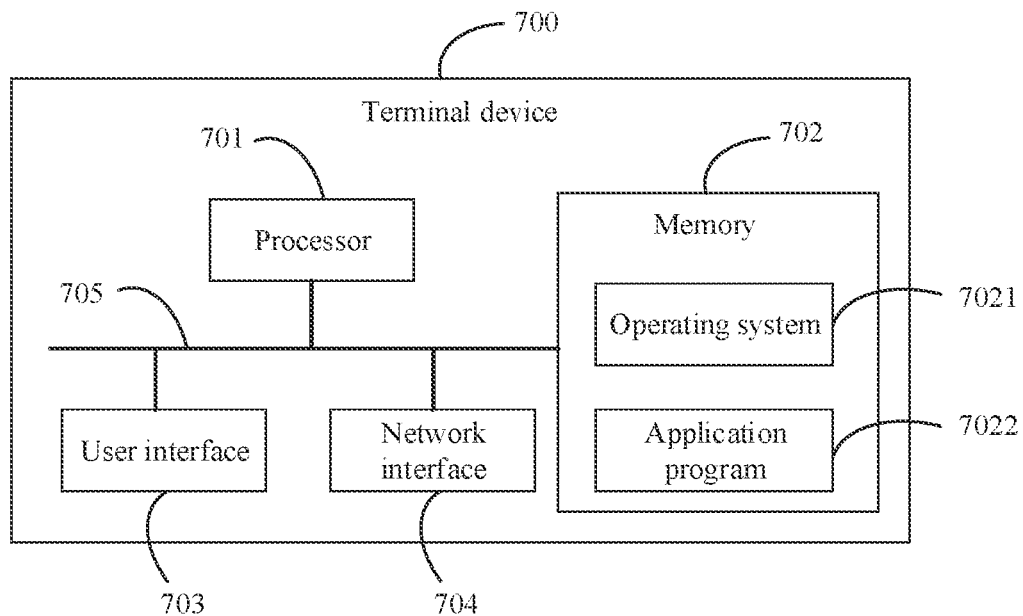
FIG. 7 is a schematic structural diagram of a terminal device 700 according to some embodiments of this disclosure.

FIG. 7 is a schematic structural diagram of a terminal device according to another embodiment of this disclosure. A terminal device 700 shown in FIG. 7 includes at least one processor 701, a memory 702, at least one network interface 704, and a user interface 703. The components of the terminal device 700 are coupled together by using a bus system 705. It can be understood that the bus system 705 is configured to implement connection communication between these components. The bus system 705 may include not only a data bus but also a power supply bus, a control bus, and a status signal bus. However, for clarity of description, various buses are marked as the bus system 705 in FIG. 5.

The user interface 703 may include a display, a keyboard, or a clicking device (for example, a mouse, a trackball (trackball), a touch panel, or a touchscreen).

It can be understood that the memory 702 in some embodiments of this disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), and an electrically erasable programmable read-only memory (EEPROM), or a flash memory. The volatile memory may be a random access memory (RAM), and the RAM is used as an external cache. For illustrative rather than restrictive description, a plurality of forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM). The memory 702 in the system and method described in some embodiments of this disclosure is intended to include but is not limited to these and any other appropriate types of memories.

In some implementations, the memory 702 stores the following elements: an executable module or a data structure, or a subset thereof, or an extended set thereof: an operating system 7021 and an application program 7022.

An operating system 7021 includes various system programs, such as a framework layer, a kernel library layer, and a driver layer, and is configured to implement various basic services and process hardware-based tasks. The application program 7022 includes various application programs, such as a media player (Media Player) and a browser (Browser), which are used to implement various application services. A program that implements the methods of some embodiments of this disclosure may be included in the application program 7022.

In some embodiments of this disclosure, the terminal device 700 further includes: a computer program stored in the memory 702 and capable of running on the processor 701, where when the computer program is executed by the processor 701, various processes of the foregoing object receiving method are implemented, with the same technical effects achieved. Details are not described herein again to avoid repetition.

The foregoing methods disclosed by some embodiments of this disclosure may be applied to the processor 701, or be implemented by the processor 701. The processor 701 may be an integrated circuit chip with a signal processing capability. In an implementation process, steps in the foregoing method may be implemented by using a hardware integrated logic circuit in the processor 701, or by using instructions in a form of software. The processor 701 may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in some embodiments of this disclosure. The general-purpose processor may be a microprocessor, or the processor may also be any conventional processor or the like. Steps of the methods disclosed with reference to some embodiments of this disclosure may be directly performed and completed by using a hardware decoding processor, or may be performed and completed by using a combination of hardware and a software module in a decoding processor. The software module may be located in a non-transitory computer-readable storage medium that is mature in the art, such as a random access memory, a flash memory, a read-only memory, a programmable read-only memory, or an electrically erasable programmable memory, or a register. The non-transitory computer-readable storage medium is located in the memory 702, and the processor 701 reads information in the memory 702 and implements, in combination with its hardware, the steps of the foregoing methods. Specifically, the non-transitory computer-readable storage medium stores a computer program, and when the computer program is executed by the processor 701, the steps in the foregoing object receiving method embodiments are implemented.

Figure 8:
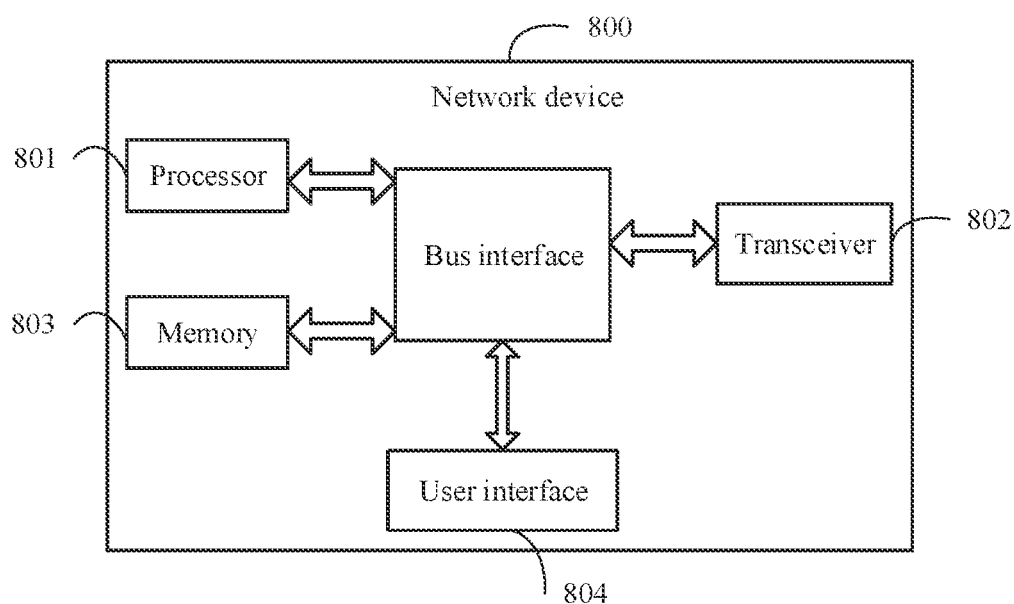
FIG. 8 is a schematic structural diagram of a network device 800 according to some embodiments of this disclosure.

FIG. 8 is a structure diagram of a network device to which an embodiment of this specification is applied. The network device can implement details of the method for assisting in receiving an object and achieve the same effect. As shown in FIG. 8, the network device 800 includes a processor 801, a transceiver 802, a memory 803, a user interface 804, and a bus interface.

In this embodiment of this specification, the network device 800 further includes: a computer program stored in the memory 803 and capable of running on the processor 801, where when the computer program is executed by the processor 801, various processes of the method for assisting in receiving an object are implemented, with the same technical effects achieved. Details are not described herein again to avoid repetition.

In FIG. 8, a bus architecture may include any quantity of interconnected buses and bridges, and specifically connects together circuits of at least one processor represented by the processor 801 and a memory represented by the memory 803. The bus architecture may further interconnect various other circuits such as a peripheral device, a voltage regulator, and a power management circuit. These are all well known in the art, and therefore are not further described in this specification. The bus interface provides interfaces. The transceiver 802 may be a plurality of components, that is, the transceiver 802 includes a transmitter and a receiver, and provides a unit for communicating with various other apparatuses on a transmission medium. For different terminal devices, the user interface 804 may also be an interface that can be externally or internally connected to a required device. The connected device includes but is not limited to a keypad, a display, a speaker, a microphone, a joystick, and the like.

The processor 801 is responsible for management of the bus architecture and general processing, and the memory 803 is capable of storing data that is used by the processor 801 during operation.

It can be understood that the embodiments described in some embodiments in this disclosure may be implemented by hardware, software, firmware, middleware, microcode, or a combination thereof. For hardware implementation, processing units can be implemented in at least one application-specific integrated circuit (ASIC), digital signal processor (DSP), digital signal processing device (DSPD), programmable logic device (PLD), field-programmable gate array (FPGA), general-purpose processor, microcontroller, microprocessor, other electronic units for performing the functions described in this disclosure, or a combination thereof.

For software implementation, the techniques described in some embodiments of this disclosure may be implemented by modules (such as processes and functions) that perform the functions described in some embodiments of this disclosure. Software code may be stored in the memory and executed by the processor. The memory may be implemented inside the processor or outside the processor.

Some embodiments of this disclosure further provide a non-transitory computer-readable storage medium, where a computer program is stored in the non-transitory computer-readable storage medium. When the computer program is executed by a processor, processes of the foregoing object receiving method or object receiving method embodiment can be implemented, with the same technical effects achieved. To avoid repetition, details are not described herein again. The non-transitory computer-readable storage medium is, for example, a read-only memory (ROM), a random access memory (RAM), a magnetic disk, or an optical disc.

Some embodiments of this disclosure further provide a computer program product including instructions. When a computer runs the instructions of the computer program product, the computer executes the object receiving method or the foregoing method for assisting in receiving an object. Specifically, the computer program product can be run on the foregoing network device.

Persons of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a non-transitory computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the method described in the embodiments of this disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are only optional implementations of this disclosure, but are not intended to limit the protection scope of this disclosure. Any variation or replacement readily figured out by persons skilled in the art within the technical scope disclosed in this disclosure shall fall within the protection scope of this disclosure. Therefore, the protection scope of this disclosure shall be subject to the protection scope of the claims.

What is claimed is:

1. An object receiving method, comprising:
   determining, by a terminal device, an association relationship between a target object and a source object, wherein
   the object comprises a reference signal or a channel, and the association relationship comprises a quasi co-location (QCL) relationship or a receive beam relationship;
   wherein the determining an association relationship between a target object and a source object comprises:
   determining the association relationship based on a type of the source object or the target object, wherein different types of source objects or target objects correspond to a same association relationship or different association relationships;
wherein
types of the source object or the target object comprise a reference signal type, a data channel type, and a control channel type.

2. The object receiving method according to claim 1, further comprising:
receiving the target object based on the association relationship.

3. The object receiving method according to claim 1, wherein
the association relationship further comprises a newly defined QCL type.

4. The object receiving method according to claim 3, wherein
the newly defined QCL type is used to determine a spatial QCL relationship corresponding to a signal to interference plus noise ratio (SINR) measurement.

5. The object receiving method according to claim 1, wherein the determining an association relationship between a target object and a source object comprises:
determining the association relationship based on at least one of configuration information for configuring the association relationship or a preset protocol.

6. The object receiving method according to claim 1, wherein the determining an association relationship between a target object and a source object comprises:
determining the association relationship based on a measurement parameter corresponding to the source object.

7. The object receiving method according to claim 6, wherein
if the measurement parameter corresponding to the source object is reference signal received power (RSRP) and signal to interference plus noise ratio (SINR), the association relationship is determined based on QCL information corresponding to the RSRP;
if the measurement parameter corresponding to the source object is reference signal received power (RSRP), the association relationship is determined based on QCL information corresponding to the RSRP; or
if the measurement parameter corresponding to the source object is signal to interference plus noise ratio (SINR), the association relationship is determined based on QCL information corresponding to the signal to interference plus noise ratio (SINR).

8. The object receiving method according to claim 1, wherein the determining an association relationship between a target object and a source object comprises:
determining the association relationship based on a type of the QCL relationship, configured by a network, between the target object and the source object.

9. The object receiving method according to claim 8, wherein the type of the QCL relationship corresponds to a measurement parameter corresponding to the source object.

10. The object receiving method according to claim 1, wherein the determining an association relationship between a target object and a source object comprises:
determining the association relationship based on a historical measurement report closest to a current moment, wherein the historical measurement report is a measurement report about a measurement parameter corresponding to the source object, reported by the terminal device.

11. The object receiving method according to claim 10, wherein
if the association relationship is determined based on the historical measurement report, and the historical measurement report is a measurement report about reference signal received power (RSRP), the association relationship is determined based on QCL information corresponding to the RSRP;
if the association relationship is determined based on the historical measurement report, and the historical measurement report is a measurement report about signal to interference plus noise ratio (SINR), the association relationship is determined based on QCL information corresponding to the SINR; or
if the association relationship is determined based on the historical measurement report, and the historical measurement report is a measurement report about reference signal received power (RSRP) and signal to interference plus noise ratio (SINR), the association relationship is determined based on QCL information corresponding to the RSRP or the SINR.

12. The object receiving method according to claim 1, wherein the determining an association relationship between a target object and a source object comprises:
determining the association relationship based on a transmission mode of transmitting the source object or the target object by a network device, wherein different transmission modes correspond to a same association relationship or different association relationships.

13. A terminal device, comprising a memory, a processor, and a wireless communication program stored in the memory and capable of running on the processor, wherein the wireless communication program is executed by the processor to perform:
determining an association relationship between a target object and a source object, wherein
the target object and a source object each comprises a reference signal or a channel, and the association relationship comprises a quasi co-location (QCL) relationship or a receive beam relationship;
wherein the wireless communication program is executed by the processor to perform:
determining the association relationship based on a type of the source object or the target object, wherein different types of source objects or target objects correspond to a same association relationship or different association relationships;
wherein types of the source object or the target object comprise a reference signal type, a data channel type, and a control channel type.

14. The terminal device according to claim 13, wherein the wireless communication program is executed by the processor to perform:
receiving the target object based on the association relationship.

15. The terminal device according to claim 13, wherein the association relationship further comprises a newly defined QCL type.

16. The terminal device according to claim 13, wherein the wireless communication program is executed by the processor to perform:
determining the association relationship based on a measurement parameter corresponding to the source object.

17. The terminal device according to claim 16, wherein
if the measurement parameter corresponding to the source object is reference signal received power (RSRP) and signal to interference plus noise ratio (SINR), the association relationship is determined based on QCL information corresponding to the RSRP;

if the measurement parameter corresponding to the source object is reference signal received power (RSRP), the association relationship is determined based on QCL information corresponding to the RSRP; or if the measurement parameter corresponding to the source object is signal to interference plus noise ratio (SINR), the association relationship is determined based on QCL information corresponding to the signal to interference plus noise ratio (SINR).

18. A non-transitory computer-readable medium, wherein the computer-readable medium stores a wireless communication program, and the wireless communication program is executed by a processor to perform:

determining an association relationship between a target object and a source object, wherein the target object and a source object each comprises a reference signal or a channel, and the association relationship comprises a quasi co-location (QCL) relationship or a receive beam relationship;

wherein the wireless communication program is executed by the processor to perform:

determining the association relationship based on a type of the source object or the target object, wherein different types of source objects or target objects correspond to a same association relationship or different association relationships; wherein types of the source object or the target object comprise a reference signal type, a data channel type, and a control channel type.

* * * * *